United States Patent
Umemoto et al.

[11] Patent Number: 5,901,606
[45] Date of Patent: May 11, 1999

[54] TRANSMISSION FOR A TRACTOR

[75] Inventors: Tomeo Umemoto; Masatoshi Iwamoto, both of Sakai, Japan

[73] Assignee: Kubota Corporation, Japan

[21] Appl. No.: 08/876,637

[22] Filed: Jun. 16, 1997

[30] Foreign Application Priority Data

| Jun. 18, 1996 | [JP] | Japan | 8-157121 |
| Jun. 18, 1996 | [JP] | Japan | 8-157122 |
| Jun. 18, 1996 | [JP] | Japan | 8-157123 |
| Jun. 18, 1996 | [JP] | Japan | 8-157124 |

[51] Int. Cl.[6] .................................. B60K 17/08
[52] U.S. Cl. ........................ 74/15.66; 74/606 R
[58] Field of Search .................. 74/15.66, 331, 74/606 R

[56] References Cited

U.S. PATENT DOCUMENTS

| 4,244,232 | 1/1981 | Murayama | 74/15.66 |
| 4,462,273 | 7/1984 | Yoshii et al. | 74/15.66 |
| 4,572,026 | 2/1986 | Weiss | 74/15.66 |
| 4,628,768 | 12/1986 | Omura et al. | 74/606 R |
| 5,058,455 | 10/1991 | Nemoto et al. | 74/606 R |
| 5,570,605 | 11/1996 | Kitagawa et al. | 74/606 R |

FOREIGN PATENT DOCUMENTS

| 61-25933 | of 1986 | Japan | F16H 3/08 |
| 7139624 | of 1995 | Japan | F16H 61/34 |

*Primary Examiner*—Dirk Wright
*Attorney, Agent, or Firm*—Webb Ziesenheim Bruening Logsdon Orkin & Hanson, P.C.

[57] ABSTRACT

A transmission housing (100) used as a body frame extending longitudinally of a tractor. The transmission housing (100) includes a first housing (1) having a front end connected to an engine housing (91), and a rear end; a first partition (1a) defining a first accommodation chamber (3) in the first housing (1) with the front end of the first housing; a second partition (1b) defining, in the first housing (1), a second accommodation chamber (4) with the first partition (1a), and a third accommodation chamber (5) with the rear end of the first housing; and a second housing (2) having a front end connected to the rear end of the first housing, and a rear end, and defining a rear accommodation chamber (6) between with the front end and the rear end. A main clutch (7) is disposed in the first accommodation chamber (3). A shuttle change speed device (8) and a main change speed device (9) are arranged longitudinally in the second accommodation chamber (4). An auxiliaxy change speed device (10) is disposed in the third accommodation chamber (5). A rear differential (13) is disposed in the rear accommodation chamber (6).

18 Claims, 9 Drawing Sheets

TRANSMISSION FOR A TRACTOR

BACKGROUND OF THE INVENTION

1. Field of the Invention

This invention relates to a transmission for a tractor for transmitting engine power to drive wheels, including a main clutch, a shuttle change speed device, a main change speed device, an auxiliary change speed device and a rear differential arranged in a transmission housing used as a body frame extending longitudinally of the tractor.

2. Description of the Related Art

Conventionally, the tractor transmission noted above is mounted in a housing having a split construction including a portion for accommodating the main clutch and a portion for accommodating the main change speed device, as disclosed in Japanese Patent Publication S61-25933 and Patent Laying-Open Publication H7139624, for example. Such a split construction requires flanges to be formed at connecting portions thereof to enable bolt connection. Thus, the transmission housing has a large construction as a whole, and an unduly large space must be allocated for the transmission housing.

The clutch, shuttle change speed device, main change speed device, auxiliary change speed device and rear differential constructed and arranged separately in the transmission housing increase a space occupied by the transmission, which is obstructive to compactness of the transmission housing.

SUMMARY OF THE INVENTION

The object of this invention is to provide a construction of a transmission housing and an arrangement of a main clutch, shuttle change speed device, main change speed device, auxiliary change speed device, rear differential and particularly transmission shafts thereof constituting a transmission, which enable compactness of the transmission housing.

The above object is fulfilled, according to this invention, by a transmission comprising a transmission housing including: a first housing having a front end connected to an engine housing, and a rear end; a first partition defining a first accommodation chamber in the first housing with the front end of the first housing; a second partition defining, in the first housing, a second accommodation chamber with the first partition, and a third accommodation chamber with the rear end of the first housing; and a second housing having a front end connected to the rear end of the first housing, and a rear end, and defining a rear accommodation chamber between with the front end and the rear end. A main clutch is disposed in the first accommodation chamber. A shuttle change speed device and a main change speed device are arranged longitudinally in the second accommodation chamber. An auxiliary change speed device is disposed in the third accommodation chamber. A rear differential is disposed in the rear accommodation chamber.

According to this construction, the main clutch, shuttle change speed device, main change speed device and auxiliary change speed device are enclosed in one common housing. Thus, the transmission housing used as a body frame of a tractor has a split construction including the above housing (the first housing) and the housing accommodating the rear differential connected to rear axles. Particularly the region enclosing the main clutch, shuttle change speed device, main change speed device and auxiliary change speed device has a single and streamlined construction which contributes to compactness of the transmission housing.

In one preferred embodiment of the invention, the main change speed device includes a first main change speed shaft and a second main change speed shaft supporting change speed gears, respectively, and the auxiliary change speed device includes a first auxiliary change speed shaft and a second auxiliary change speed shaft supporting change speed gears, respectively, the first main change speed shaft and the second main change speed shaft being supported by the first partition and the second partition. Further, the first auxiliary change speed shaft and the second auxiliary change speed shaft are supported by the second partition and a third partition between the third accommodation chamber and the fourth accommodation chamber. In this embodiment, each change speed device has two shafts supported by the partitions, which facilitates assembly and disassembly.

To simplify the transmission structure, in another preferred embodiment of this invention, the first auxiliary change speed shaft and a differential drive shaft of the rear differential are arranged rearwardly of and coaxially with the second change speed shaft. Further, the second auxiliary change speed shaft is arranged rearwardly of and coaxially with the first change speed shaft. Thus, the above features realize a very simple transmission structure having two axial lines extending longitudinally thereof.

To simplify the shuttle change speed device, this device may be mounted on the first main change speed shaft and the second main change speed shaft. Particularly where the shuttle change speed device is disposed closer than the main change speed device to an engine, all speeds outputted from the main change speed device and auxiliary change speed device may be used for both forward traveling and backward traveling. Moreover, an advantage of light control is provided since shifting operations are effected in low-torque regions of the drive transmitting line close to the engine.

Where a creep change speed device is included to enable an operation requiring ultra-slow speed, the creep change speed device may be disposed in the third accommodation chamber. The creep change speed device may be mounted on the first auxiliary change speed shaft and the second auxiliary change speed shaft. This construction requires no addition creep shaft.

The transmission may further comprise a coupling for connecting the second auxiliary change speed shaft and the differential drive shaft, a front wheel transmission shaft for transmitting power from the differential drive shaft to a front differential, and a front wheel drive switching device for selectively branching power from the differential drive shaft to the front wheel transmission shaft. Then, this transmission is adapted for four wheel drive. In this case, a shifter may be provided which is slidable on the coupling between a coupling position for coupling the differential drive shaft and the front wheel transmission shaft and an uncoupling position for uncoupling the differential drive shaft and the front wheel transmission shaft. Here, the coupling may be used as a support for the shifter. This contributes toward a reduction in the number of parts and cost reduction as well. In a specific embodiment, the transmission further comprises a gear type interlock mechanism for connecting the differential drive shaft and the front wheel transmission shaft, the gear type interlock mechanism including a drive gear rotatably supported by the second auxiliary change speed shaft, and a driven gear fixed to the front wheel transmission shaft and meshed with the drive gear, the shifter in the coupling position engaging both the drive gear and the coupling. The above features realize a very simple, four wheel drive transmission structure having three axial lines extending longitudinally thereof.

Other features and advantages of this invention will be apparent from the following description of the preferred embodiments to be taken with reference to the drawings.

DESCRIPTION OF THE PREFERRED EMBODIMENTS

Embodiments of this invention will be described hereinafter with reference to the drawings.

Figure 1:
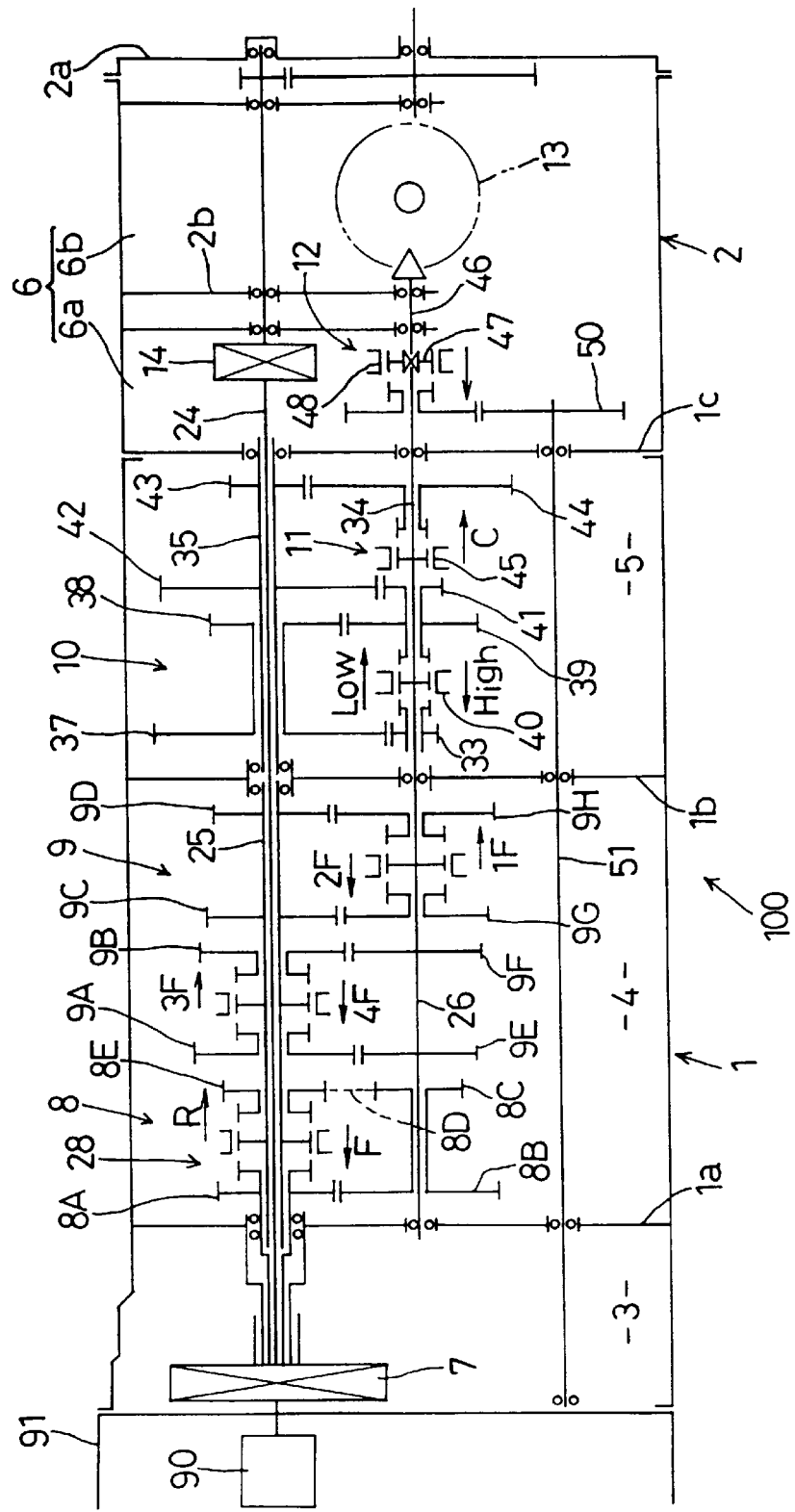
FIG. 1 is a schematic view showing a transmission according to this invention.

FIG. 1 schematically shows an entire tractor transmission forming a power transmission line for transmitting the power of an engine 90 to drive wheels. A transmission housings 100 is connected to an engine housing, more particularly to a flywheel housing 91, forming part of the engine 90, to act as a body frame of the tractor. The transmission housing 100 includes a first housing 1 having a front end and a rear end, wherein the first housing is integrally formed between the front end and the rear end, and the front end is thereof connected to the flywheel housing 91,. A second housing 2, having a first end and a rear end, where the second housing is integrally formed between the first end and the rear end and the first end is connected to the rear end of the first housing 1. The first housing 1 is substantially cylindrical, and has a first partition 1a and a second partition 1b formed on inner walls thereof. The first partition 1a is positioned rearwardly of and longitudinally spaced apart from the front end of the first housing, defining a first accommodation chamber 3 with the front end of the first housing 1. The second partition 1b is positioned rearwardly and longitudinally spaced apart from the first partition and is positioned forwardly of and spaced away from the rear end of the first housing, defining a second accommodation chamber 4 with the first partitions 1a, and a third accommodation chamber 5 with the rear end of the first housing 1. A third partition 1c is disposed at a connection between the first housing 1 and second housing 2. The second housing 2 is also hollow and defines a rear accommodation chamber 6, with a front end thereof connected to the first housing 1, and a rear end closed by a rear cover 2a. The second housing 2 includes a fourth partition 2b. Consequently, the rear accommodation chamber 6 is divided into a fourth accommodation chamber 6a formed between the third partition 1c and the fourth partition 2b and a fifth accommodation chamber 6b formed between the fourth partition 2b and the rear cover 2a.

The first accommodation chamber 3 has a main clutch 7 mounted therein. The second accommodation chamber 4 has a shuttle change speed device 8 and a main change speed device 9 mounted therein to act as upstream stages of the power transmission line for receiving engine power through the main clutch 7. The third accommodation chamber 5 has an auxiliary change speed device 10 and a creep change speed device 11 mounted therein. The fourth accommodation chamber 6a formed in the second housing 2 has a front wheel drive switching device 12 and a hydraulic clutch 14 of a PTO system mounted therein. The fifth accommodation chamber 6b has a rear differential 13 mounted therein.

Figure 2:
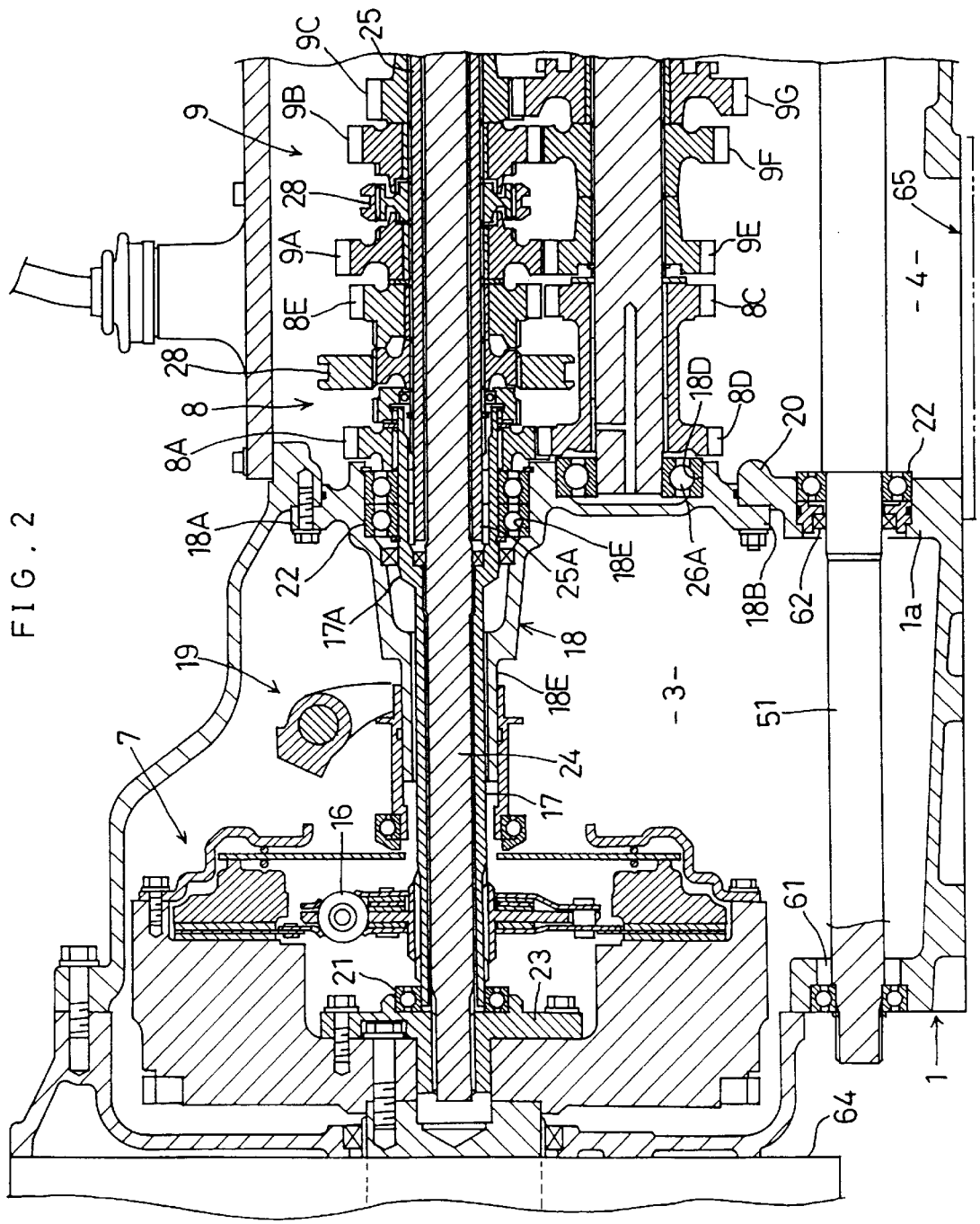
FIG. 2 is a sectional view of a forward region of the transmission shown in FIG. 1.

As shown in FIG. 2, the main clutch 7 is mounted in a flywheel 15 of the engine 90. A propeller shaft 17 of a traveling system is connected to the main clutch 7 through a damper 16. The propeller shaft 17 has a tubular holder 18 mounted thereon. The tubular holder 18 has a clutch release 19 mounted on a tube portion thereof In FIG. 2, the release 19 is slidable to engage and disengage the main clutch 7, which is the diaphragm type, to rotate or stop the propeller shaft 17.

The tubular holder 18, along with an inward projection 20 formed on an inner wall of the first housing 1, constitutes the first partition 1a for substantially dividing the first accommodation chamber 3 and the second accommodation chamber 4. The tubular holder 18 has an insert portion 18A formed integral with a proximal end thereof and fitted in an opening (which is substantially circular in front or rear view) defined by the projection 20. The insert portion 18A is fitted backward into the opening of the projection 20 to have a base 18B bolted to the projection 20.

The insert portion 18A of tubular holder 18 includes bearing recesses 18C and 18D formed in two, upper and lower, stages. A tubular shaft portion 18E extends forward coaxially with the upper bearing recess 18C. The propeller shaft 17 extends through the tubular shaft 18E and is rotatably supported at a front end and a rear end thereof by bearings 21 and 22.

The propeller shaft 17 is a tubular shaft including a rearward, large-diameter portion 17A supported by the bearing 22 and extending into the second accommodation chamber 4. A PTO propeller shaft 24 rotatably extends through this tubular shaft, and is connected to the flywheel 15 through a coupling 23.

Figure 3:
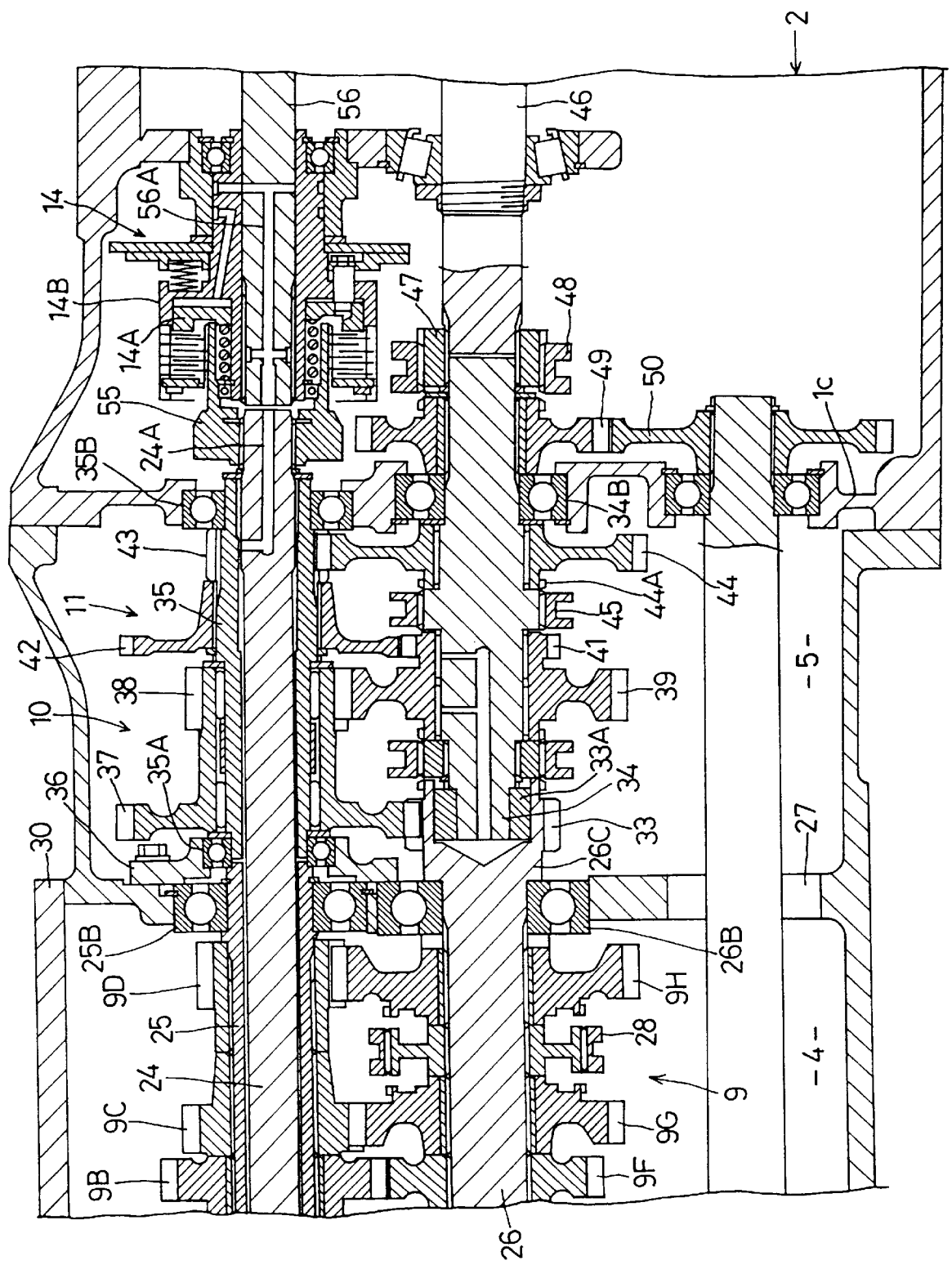
FIG. 3 is a sectional view of an intermediate region of the transmission shown in FIG. 1.

As shown in FIGS. 2 and 3, the shuttle change speed device 8 and main change speed device 9 in the second accommodation chamber 4 are arranged axially on a first main change speed shaft 25 and a second main change speed shaft 26 extending parallel to each other. The first main change speed shaft 25 is a tubular shaft coaxial with the propeller shaft 17. The first main change speed shaft 25 has a front end thereof inserted into the large-diameter portion 17A of propeller shaft 17 to be supported by a needle bearing 25A, and a rear end supported by the second partition 1b through a bearing 25B. The second main change speed shaft 26 is supported at front and rear ends thereof by bearings 26A and 26B, respectively.

The shuttle change speed device 8 and main change speed device 9 are both synchromesh change speed gearings, with the first main change speed shaft 25 acting as an input shaft and the second main change speed shaft 26 an output shaft thereof The first main change speed shaft 25 is located above the second main change speed axis 26. Synchronizing shift means 28 are mounted on the first main change speed shaft 25. The shuttle change speed device 8 is disposed in a forward region (close to the engine 1) of the second accommodation chamber 4, while the main change speed device 9, including the first means change speed shaft, is disposed in a rearward region (far from the engine 1) of the second accommodation chamber 4 where the first main change speed shaft is supported to the first housing only through the first and second partitions in the first housing. The synchronizing shift means 28 are mounted on the first main change speed shaft 25 having a small torque transmitted from the engine 1. Thus, the synchronizing shift means 28 may have a smaller diameter than when they are mounted on the second main change speed shaft 26. This contributes to a reduction in height and width of the clutch housing 2. In addition, the shift fork for sliding the shift means 28 may have a reduced length to realize smooth sliding movement.

The shuttle change speed device 8 comprising synchromesh gearing includes a first gear 8A mounted on the large diameter portion 17A of propeller shaft 17, a second gear 8B mounted on the second main change speed shaft 26 and meshed with the first gear 8A, a third gear 8C formed integral with the second gear 8B, and a fourth gear 8E mounted on the first main change speed shaft 25 rearwardly of the first gear 8A and interlocked to the third gear 8C through an idle gear 8D. The synchronizing shift means 28 is interposed between the first gear 8A and fourth gear 8E. Forward drive (forward rotation) is established by sliding the shift means 28 in the direction indicated by arrow F in FIG. 1. Backward drive (backward rotation) is established by sliding the shift means 28 in the direction indicated by arrow R. The power transmission line is switchable between backward and forward across neutral.

The main change speed device 9 comprising synchromesh gearing provides four speeds from a first speed (1F) to a fourth speed (4F) in this embodiment. The main change speed device 9 includes a fourth speed drive gear 9A and a third speed drive gear 9B rotatably mounted on the first main change speed shaft 25, a second speed drive gear 9C and a first speed drive gear 9D fixed to the first main change speed shaft 25, synchronous change speed means 28 interposed between the fourth speed drive gear 9A and third speed drive gear 9B, a fourth speed driven gear 9E and a third speed driven gear 9F fixed to the second main change speed shaft 26, a second speed driven gear 9G and a first speed driven gear 9H rotatably mounted on the second main change speed shaft 26, and synchronizing shift means 28 interposed between the second speed driven gear 9G and first speed driven gear 9H. The drive gears 9A, 9B, 9C and 9D are meshed with the driven gear 9E, 9F, 9G and 9H, respectively.

Four speeds, including neutral, are produced by sliding the synchronizing shift means 28 in the directions of arrows 1F–4F shown in FIG. 1. The synchronizing shift means 28 of shuttle change speed device 8 and main change speed device 9 are shown to be the keyed inertia lock type, but may be the pinned inertia lock type, constant load type or servo type.

Figure 5:
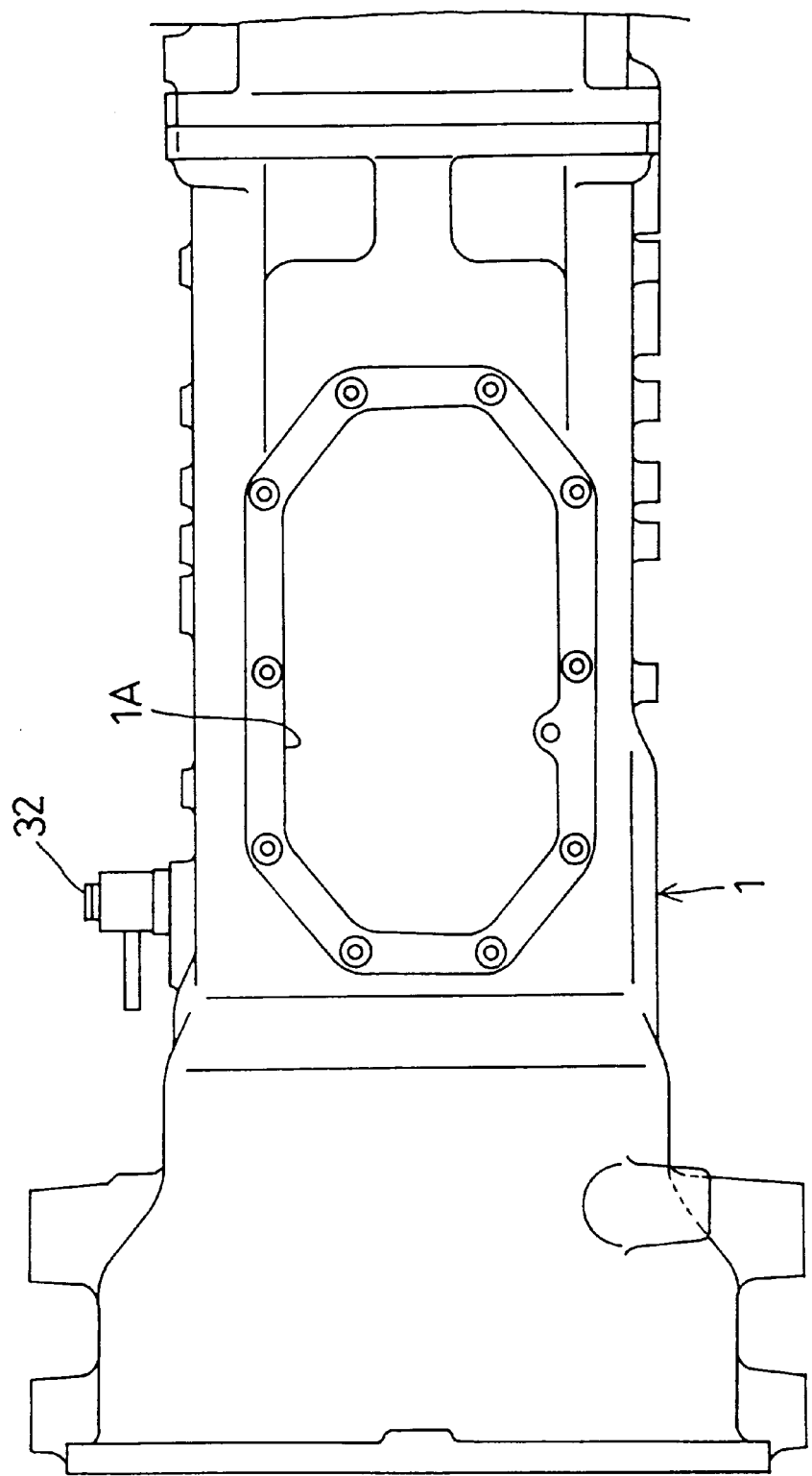
FIG. 5 is a plan view of the forward region of the transmission shown in FIG. 1.
Figure 6:
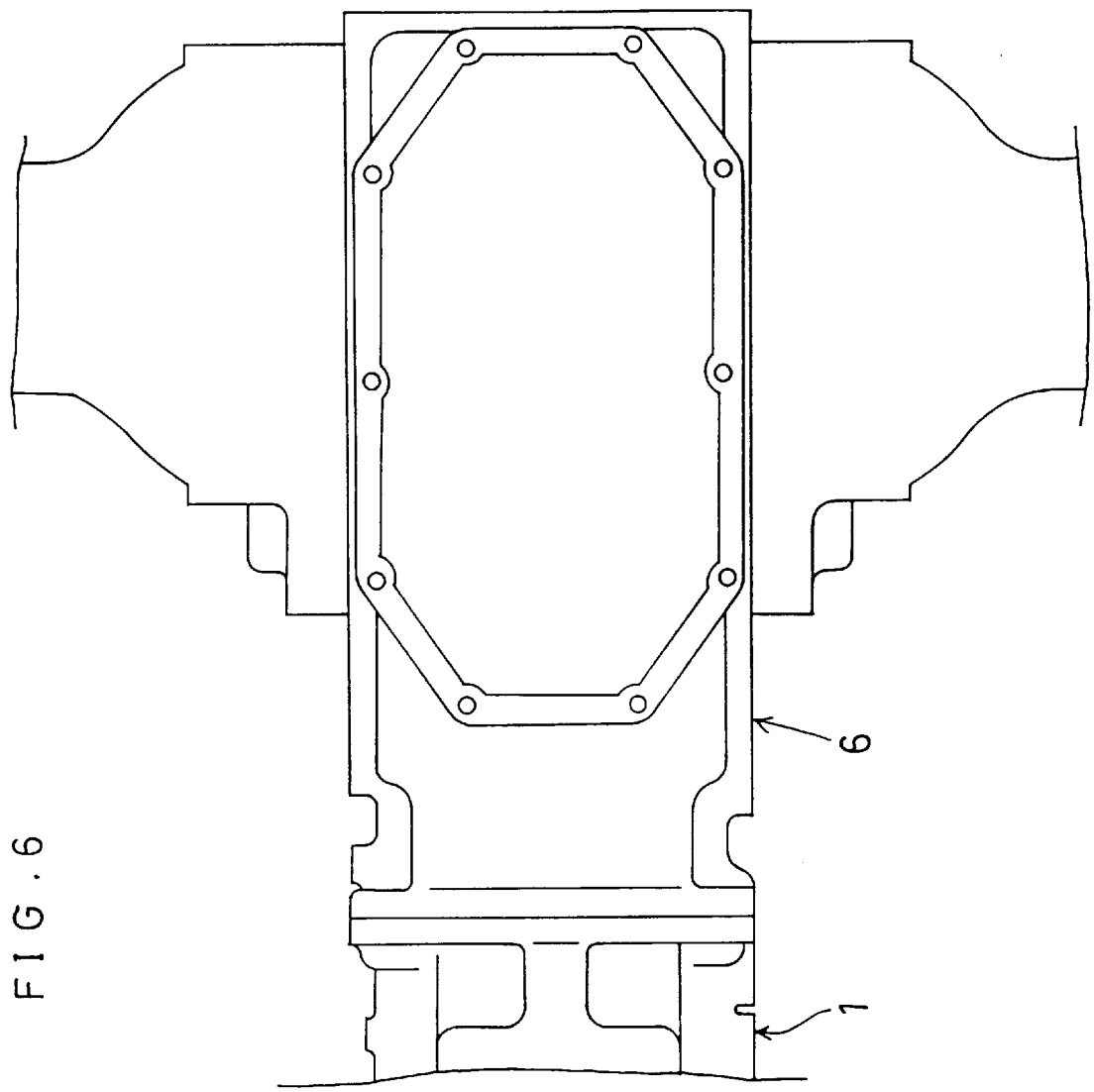
FIG. 6 is a plan view of the rearward region of the transmission shown in FIG. 1.

As shown in FIG. 2 and 5, a rectangular opening 1A is formed in an upper wall of the second accommodation chamber 4 of the first housing 1. The opening 1A is closed by a removable lid 30 having a shift lever 31 erected thereon for operating the synchronizing shift means 28 of main change speed device. The lid 30 supports a shift rod slidably attached to an inner surface thereof the shift rod having a shift fork slidable by the shift lever 31. A control shaft 32 for controlling the synchronizing shift means 28 of shuttle change speed device 8 extends transversely to be supported by a side wall of the first housing 1.

Thus, by coaxially arranging the shuttle change speed device 8 and main change speed device 9 in the second accommodation chamber 4 of the first housing 1, the shift control system (shift lever 31, control shaft 32 and so on) may be put together to improve operability.

FIG. 3 shows details of the auxiliary change speed device 10 and creep change speed device 11 arranged in the third accommodation chamber 5 of the first housing 1. As seen from FIGS. 1 and 3, the second main change speed shaft 26 extends rearward through the second partition 1b into the third accommodation chamber 5. A recess 26D is cut in a projecting end 26C of the shaft 26. Engaging teeth 33A are formed peripherally of the projecting end 26C for engaging a first auxiliary change speed gear 33. A second auxiliary change speed shaft 34 is disposed coaxially with the second main change speed shaft 26. The shaft 34 has a front end thereof fitted in the recess 26D and supported by a bearing 34A, and is supported in a rearward position thereof by a bearing 34B mounted in the third partition 1c. The shaft 34 extends further rearward from the bearing 34B.

A first auxiliary change speed shaft 35 of tubular shaft construction is disposed coaxially with the first main change speed shaft 25. The shaft 35 has a front end thereof supported by a bearing 35A fitted in a bearing holder 36 mounted in the second partition 1b. The rear end of the first auxiliary change speed shaft 35 is supported by a bearing 35B mounted in the third partition 1c. The bearing holder 36 is bolted to a rear surface of the second partition 1b to set the bearing 35A in position. The bearing 35A fitted in the bearing holder 36 straddles the rear end of the first main change speed shaft 25 and the front end of the first auxiliary change speed shaft 35.

The first auxiliary change speed shaft 35 rotatably supports, through a needle bearing or the like, a second, reduction gear 37 meshed with the first gear 33, and a third, small diameter gear 38 formed integral with the second gear 37. The second auxiliary change speed shaft 34 rotatably supports, through a needle bearing or the like, a fourth gear 39 meshed with the third gear 38 to produce a slow speed. The fourth gear 39 has engaging teeth 39A axially opposed to the engaging teeth 33A formed on the projecting end 26C. A shifter 40 is slidably mounted on the second auxiliary change speed shaft 34 for sliding into engagement with the engaging teeth 33A and 39A. By sliding the shifter 40 in the direction of arrow High in FIG. 1 to engage the engaging teeth 33A, the second main change speed shaft 26 and the auxiliary change speed shaft 34 are directly coupled to each other, whereby the auxiliary change speed device 10 is placed in high-speed state. By sliding the shifter 40 in the direction of arrow Low in FIG. 1 to engage the engaging teeth 39A, the auxiliary change speed device 10 is placed in high-speed state. Thus, the auxiliary change speed device 10 is switchable by sliding the shifter 40 to produce two, high and low, speeds and neutral.

The third accommodation chamber 5 of the first housing 1 has the auxiliary change speed device 10 and creep change speed device 11 arranged axially therein. The third accommodation chambers 5 is connected to the front end of the second housing 2 containing the differential 13. Consequently, the devices 8, 9, 10, 11, and 13 are arranged with a balanced weight distribution in the first housing 1 and second housing 2. This enables manufacturing of a utility tractor capable of a highly efficient front loading operation.

As seen from FIGS. 1 and 3, the second auxiliary change speed shaft 34 supports a creep input gear 41 formed integral with the third, low speed gear 39 of the auxiliary change speed device 10. The first auxiliary change speed shaft 35 has a reduction gear 42 meshed with the input gear 41, and a creep output gear 43 of smaller diameter than the reduction gear 42, arranged axially thereon. Further, the second auxiliary change speed shaft 34 has a large diameter creep gear 44 relatively rotatably mounted thereon and meshed with the creep output gear 43. The second auxiliary change speed shaft 34 also supports a creep shifter 45 for engageable with engaging teeth 44A of the creep gear 44. A creep speed is produced, when the auxiliary change speed device 10 is in low speed state, by sliding the shifter 45 in the direction of arrow C in FIG. 1 to join the engaging teeth 44A of the creep gear 44 with the second auxiliary change speed shaft 34. The creep change speed device 11 shares the shafts (first auxiliary change speed shaft 35 and second auxiliary change speed shaft 34) with the auxiliary change speed device 10, and does not require additional shafts. This feature reduces the number of parts and facilitates assembly and disassembly. In addition, the creep speed is produced only when the auxiliary change speed device 10 is in low speed state, thereby dispensing with a wasteful number of speed stages.

The second auxiliary change speed shaft 34 receiving a joint output of the auxiliary change speed device 10 and creep change speed device 11 extends rearward from the bearing 34B. The transmission case 6 contains a differential drive shaft 46 of the bevel pinion type of the rear differential 13 disposed coaxially with the second auxiliary change speed shaft 34. The projecting end of the change speed shaft 34 is connected to the front end of differential drive shaft 46 by a shaft coupling 47. A shifter 48 is slidably mounted through splines or the like on the shaft coupling 47 for switching drive transmission to the front wheels. By sliding the shifter 48 in the direction of arrow D in FIG. 1 into engagement with engaging teeth 49A of a front wheel drive gear 49, the front wheels are driven, synchronously with the rear wheels, through a front wheel transmission gear 50 and a front wheel transmission shaft 51 and so on. In this way, switching may be made from a rear wheel drive mode to a four wheel drive mode. The transmission shaft 51 is mounted in a lower region of the second housing 2 to extend parallel to the second main change speed shaft 26 and the second auxiliary change speed shaft 34 through a perforation 27 formed in the second partition 1b. The front wheel drive gear 49 is mounted on a projecting portion of the transmission shaft 34 to be rotatable through a needle bearing or the like. The front wheel transmission gear 50 is mounted on the transmission shaft 51 and meshed with the drive gear 49.

Figure 7:
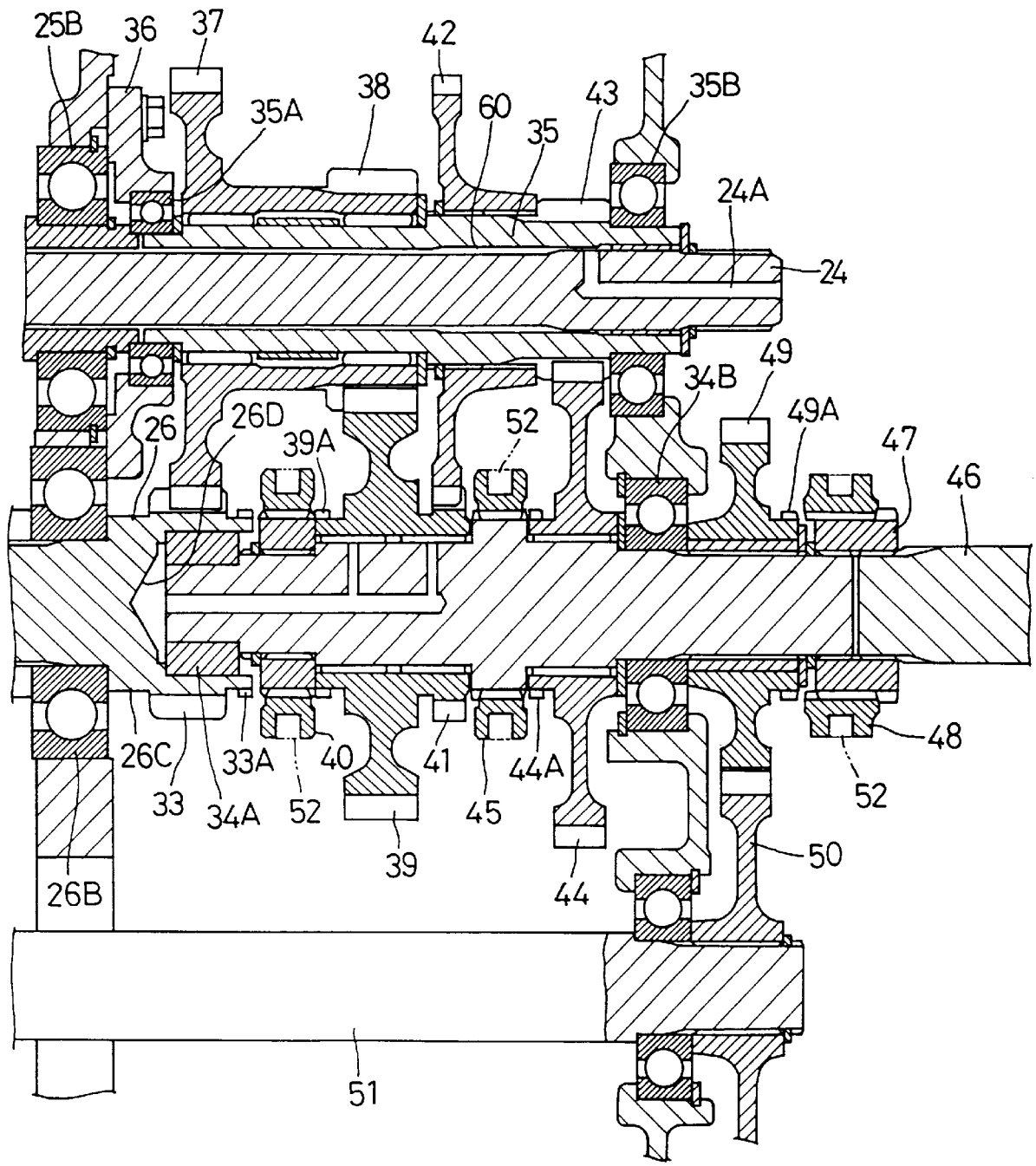
FIG. 7 is a sectional view of an auxiliary change speed device and a creep change speed device of the transmission shown in FIG. 1.
Figure 8:
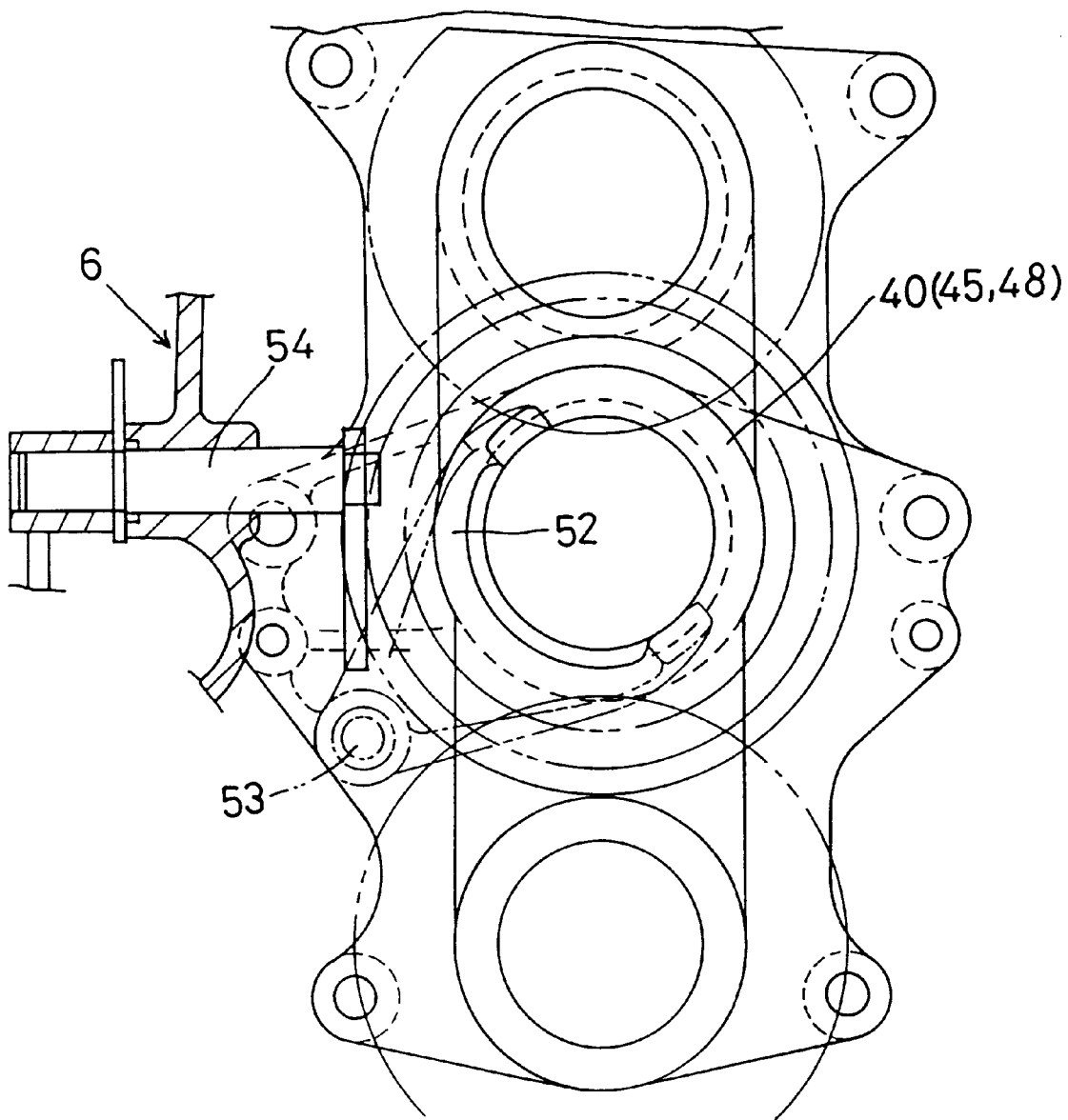
FIG. 8 is a side view in vertical section of the auxiliary change speed device and creep change speed device shown in FIG. 7.

The second auxiliary change speed shaft 34 and differential drive shaft 46 are arranged coaxially with each other as noted above. Thus, as shown in FIGS. 7 and 8, the auxiliary change speed shifter 40, creep shifter 45 and front wheel drive switching shifter 48 may have the same diameter. These shifters 40, 45, and 48 may be operated by the same shift fork 52 and fork shaft 53. This enables a reduction in the number of parts, and improvement in stock management, operability and so on.

Figure 4:
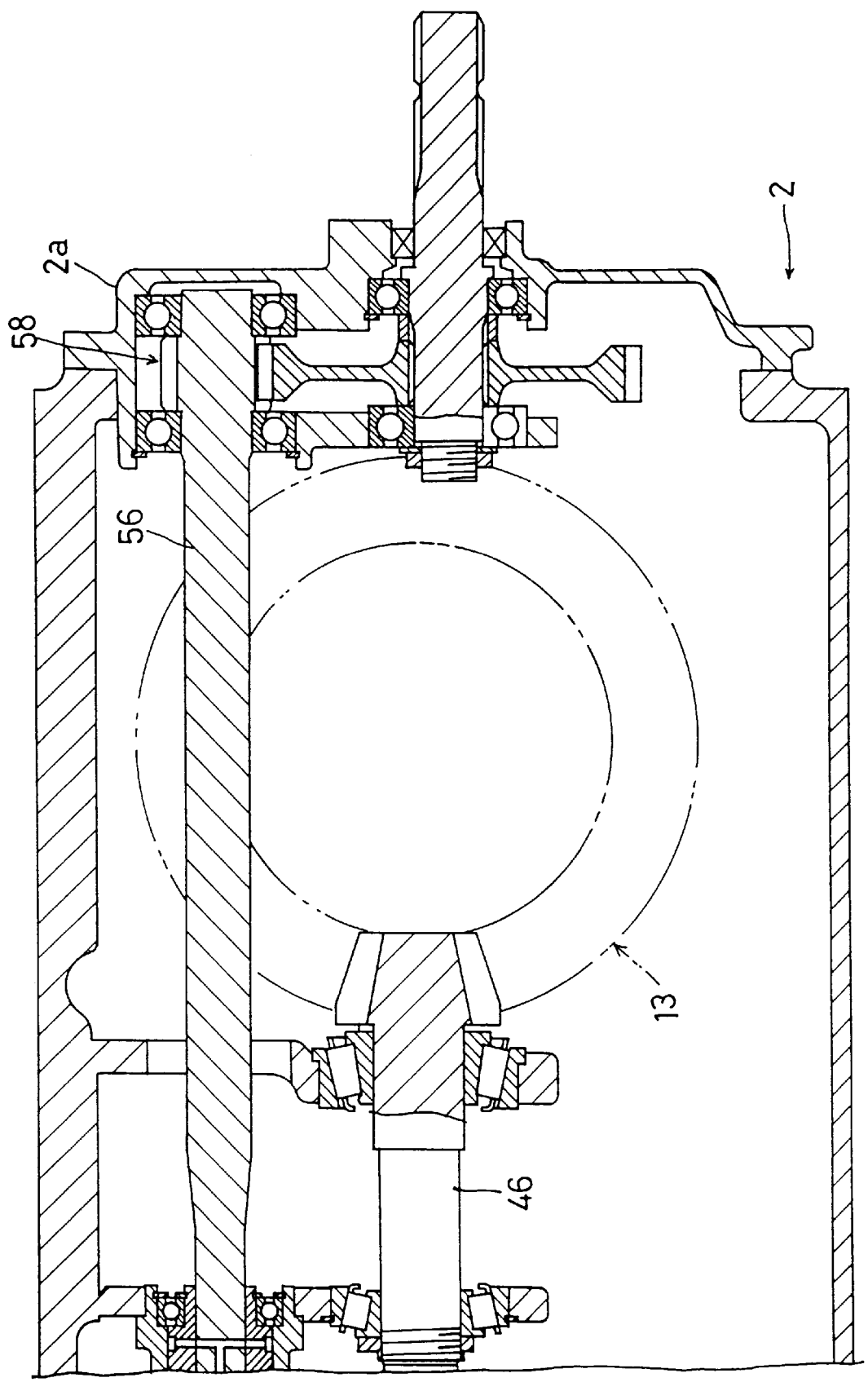
FIG. 4 is a sectional view of a rearward region of the transmission shown in FIG. 1.

As shown in FIG. 3, the PTO propeller shafts 24 extending through hollow interiors of the propeller shaft 17, first main change speed shaft 25 and first auxiliary change speed shaft 35 is connected to a transmission shaft 56 through the PTO hydraulic clutch 14 having an elastic buffer coupling 55. As shown in FIG. 4, the transmission shaft 56 is connected to a PTO change speed device 58 mounted in the rear cover 2a of the second housing 2. The power subjected to a change speed by the PTO change speed device 58 is outputted through a PTO shaft 59. As shown in FIG. 3, the PTO hydraulic clutch 14 is operable by pressure oil applied from a control valve, not shown, to a pressurizing piston 14A to place a plurality of clutch disks 14B in pressure contact.

The oil returning from the clutch 14 is used as a forced lubricant of the synchronizing shift means 28. That is, oil passages 24A and 56A are formed in the PTO propeller shaft 24 and PTO transmission shaft 56 to extend axially thereof to communicate with each other. The clutch return oil (or clutch cooling oil) is supplied to the passages 24A and 56A. The lubricant is caused to flow into slight gaps between the PTO propeller shaft 24, first main change speed shaft 25 and first auxiliary change speed shaft 35. The first main change speed shaft 25 defines lubricant gush bores radially thereof in opposed relationship to the synchronizing shift means 28. This construction provides lubricant supply means 60 for acting on sliding parts of the synchronizing shift means 28. Even though the synchronizing shift means 28 are arranged on the first main change speed shaft 25, lubrication of the shift means 28 is secured to enable a smooth, light and reliable change speed operation.

A gear lubricant (oil surface being indicated by L) is stored in the second accommodation chamber 4, third accommodation chamber 5 and rear accommodation chamber 6 of the first housing 1. To stop the lubricant flowing into the first accommodation chamber 3, an oil ring is mounted peripherally of the insert portion 18A of tubular holder 18, and oil seals 62 are provided for the bearing 61 and bearing 22 of the front wheel transmission shaft 51. Further, an oil seal 63 is provided to prevent the forced lubricant from leaking into the tubular holder 18 (FIG. 2).

The front wheel transmission shaft 51 may extend through a base 61 of the first partition 1a and along a lower surface of an engine oil pan 64 to be interlocked to a front differential drive shaft (not shown). Alternatively, the front wheel transmission shaft 51 may be interlocked by gearing to the front differential drive shaft through an opening 65 formed in a bottom wall of the second accommodation chamber 4. In the former case, the opening 65 is closed by a sealed lid. In the latter case, the bearing 61 is closed by a sealed lid.

Figure 9:
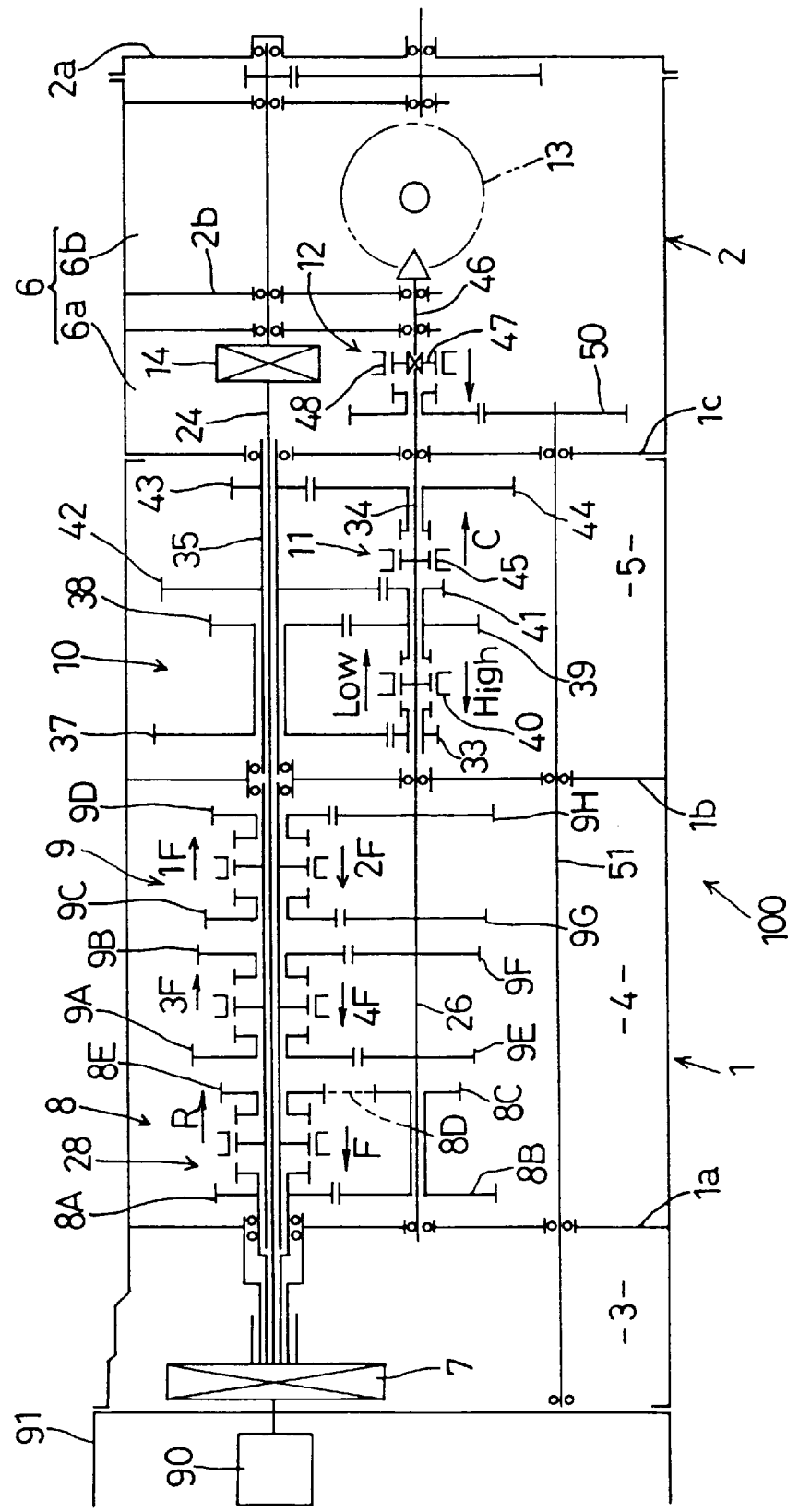
FIG. 9 is a schematic view showing a transmission in another embodiment of this invention.

The transmission shown in FIG. 9 is different from the one shown in FIG. 1 in that the two synchronizing shift means 28 of the main change speed device 9 are mounted on the first main change speed shaft 25. Specifically, the second speed drive gear 9C and first speed drive gear 9D are rotatably mounted on the first main change speed shaft 25. The second speed driven gear 9G and first speed driven gear 9H are rotatably mounted on the second main change speed shaft 26. The synchronizing shift means 28 are disposed between the second speed drive gear 9C and first speed drive gear 9D. A selection between the two embodiments often is a question of designing convenience, i.e. whether the control system for the shuttle change speed device and main change speed device 9 should be placed in one location or should be placed in separate locations.

What is claimed is:

1. A transmission for a tractor for transmitting engine power to drive wheels, comprising:
   a transmission housing used as a body frame extending longitudinally of said tractor, said transmission housing including:
   first housing having a front end connected to an engine housing and a rear end, said first housing being integrally formed between said front end and said rear end;
   a first partition defining a first accommodation chamber in said first housing with said front end of said first housing;
   a second partition defining, in said first housing, a second accommodation chamber with said first partition, a third accommodation chamber with said rear end of said first housing; and a second housing having a front end connected to said rear end of said first housing, and rear end, and defining a rear accommodation chamber between said front end and said rear end, said second housing being integrally formed between said front end and said rear end;

a main clutch disposed in said front accommodation chamber;

a shuttle change speed device and a main change speed device arranged longitudinally in said second accommodation chamber;

an auxiliary change speed device disposed in said third accommodation chamber; and a rear differential disposed in said rear accommodation chamber.

2. A transmission as defined in claim 1, further comprising a third partition disposed between said third accommodation chamber and said rear accommodation chamber.

3. A transmission as defined in claim 2, wherein said main change speed device includes a first main change speed shaft and a second main change speed shaft supporting change speed gears, respectively, and said auxiliary change speed device includes a first auxiliary change speed shaft and a second auxiliary change speed shaft supporting change speed gears, respectively, said first main change speed shaft and said second main change speed shaft being supported by said first partition and said second partition, said first auxiliary change speed shaft and said second auxiliary change speed shaft being supported by said second partition and said third partition.

4. A transmission as defined in claim 3, wherein said first auxiliary change speed shaft and a differential drive shaft of said rear differential are arranged rearwardly of and coaxially with said second change speed shaft.

5. A transmission as defined in claim 4, wherein said second auxiliary change speed shaft is arranged rearwardly of and coaxially with said first change speed shaft.

6. A transmission as defined in claim 3, wherein said shuttle change speed device is mounted on said first main change speed shaft and said second main change speed shaft.

7. A transmission as defined in claim 6, wherein said shuttle change speed device is disposed closer than said main change speed device to an engine.

8. A transmission as defined in claim 3, wherein said third accommodation chamber further contains a creep change speed device.

9. A transmission as defined in claim 8, wherein said creep change speed device is mounted on said first auxiliary change speed shaft and said second auxiliary change speed shaft.

10. A transmission as defined in claim 1, further comprising:

a coupling for connecting said second auxiliary change speed shaft and said differential drive shaft;

a front wheel transmission shaft for transmitting power from said differential drive shaft to a front differential; and a front wheel drive switching device for selectively branching power from said differential drive shaft to said front wheel transmission shaft, said front wheel drive switching device including a shifter slidable on said coupling between a coupling position for coupling said differential drive shaft and said front wheel transmission shaft and an uncoupling position for uncoupling said differential drive shaft and said front wheel transmission shaft.

11. A transmission as defined in claim 10, further comprising a gear type interlock mechanism for connecting said differential drive shaft and said front wheel transmission shaft, said gear type interlock mechanism including a drive gear rotatably supported by said second auxiliary change speed shaft, and a driven gear fixed to said front wheel transmission shaft and meshed with said drive gear, said shifter in said coupling position engaging both said drive gear and said coupling.

12. A transmission as defined in claim 3, wherein said first, second and third partitions are formed as bearing holders.

13. A transmission as defined in claim 12, wherein said first partition includes a tubular portion for supporting a clutch release hub of said main clutch slidably mounted thereon.

14. A transmission as defined in claim 1, wherein said first partition is positioned rearwardly of and longitudinally spaced apart from said front end of said first housing, and said second partition is positioned rearwardly of and longitudinally spaced apart from said first partition and forwardly of and spaced away from said rear end of said first housing, wherein said first partition and said second partition cooperating to define said second accommodation chamber.

15. A transmission as defined in claim 1, wherein said main change speed device includes a first main change speed shaft, wherein said first main change speed shaft is supported to said first housing only through said first and second partitions.

16. A transmission as defined in claim 1, wherein no partition is provided between said shuttle change speed device and said main change speed device.

17. A transmission for a tractor for transmitting engine power to drive wheels, comprising:

a transmission housing used as a body frame extending longitudinally of said tractor, said transmission housing including:

a first housing having a front end connected to an engine housing and a rear end, said first housing being integrally formed between said front end and said rear end;

a first partition positioned rearwardly of and longitudinally spaced apart from said front end; and a second partition positioned rearwardly of and longitudinally spaced apart from said first partition, said second partition positioned forwardly of and spaced away from said rear end;

wherein said first partition and said second partition define a second accommodation chamber.

18. A transmission as defined in claim 1, further comprising a second housing having a front end and a rear end, said second housing being integrally formed between said front end and said rear end, said front end forming a third partition and said rear end forming a rear cover, said third partition and said rear cover defining a rear accommodation chamber.

* * * * *